Dec. 17, 1946.    R. W. YOUNG    2,412,665
MEASURING APPARATUS
Filed May 27, 1944    2 Sheets-Sheet 1
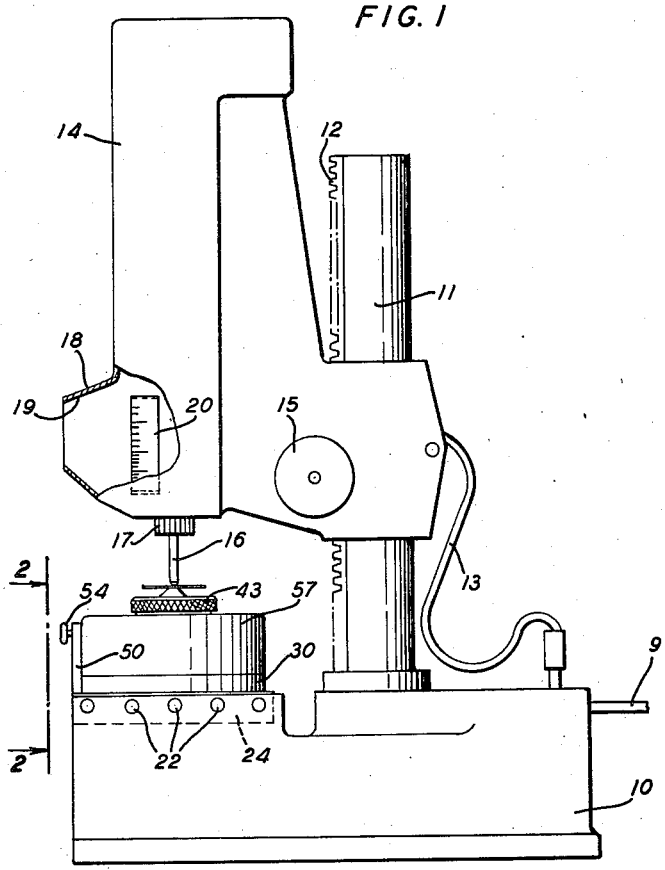
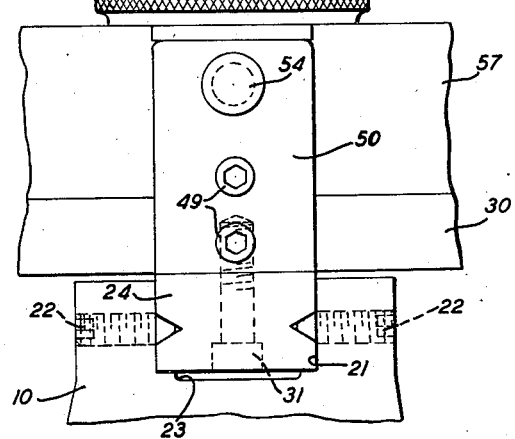
INVENTOR
R. W. YOUNG
BY
E. R. Nowlan
ATTORNEY Dec. 17, 1946.     R. W. YOUNG     2,412,665
MEASURING APPARATUS
Filed May 27, 1944     2 Sheets-Sheet 2
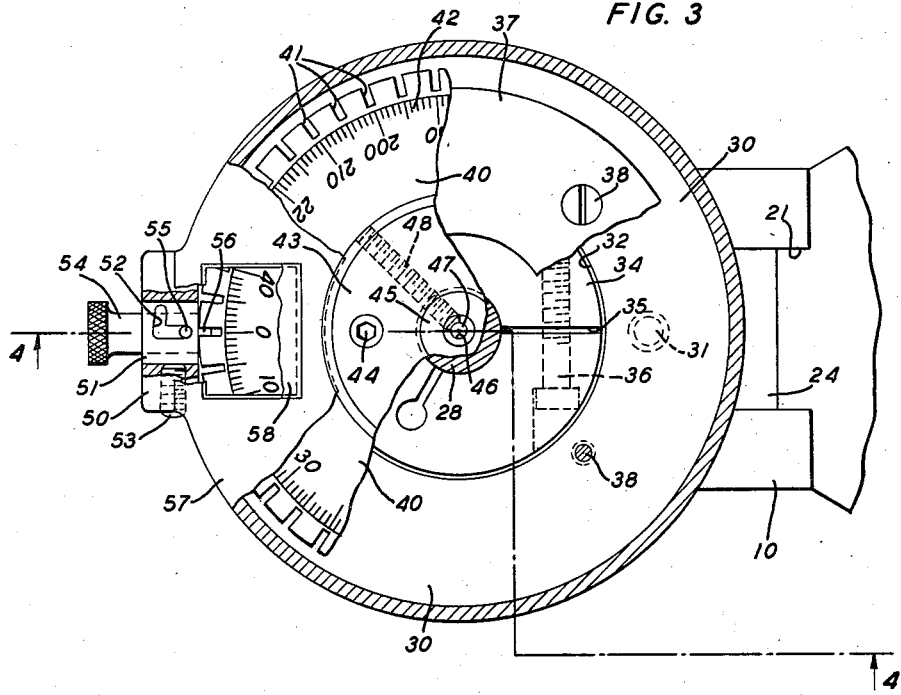
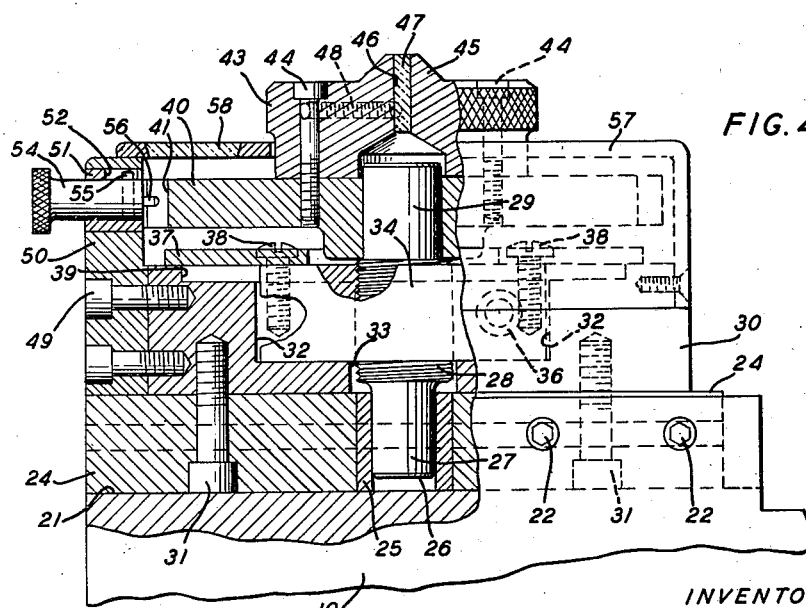
INVENTOR
R.W. YOUNG
BY
E.R. Nowlan
ATTORNEY Patented Dec. 17, 1946

2,412,665

UNITED STATES PATENT OFFICE 2,412,665

MEASURING APPARATUS

Roger W. Young, Jersey City, N. J., assignor to Western Electric Company, Incorporated, New York, N. Y., a corporation of New York Application May 27, 1944, Serial No. 537,610

2 Claims. (Cl. 33—147)

This invention relates to measuring apparatus, and more particularly to an adjustable anvil for a device for measuring a linear dimension.

There has arisen recently a large scale demand, in the electrical arts, for slices of crystalline material, particularly quartz, of unusually accurate predetermined thickness and width. Such crystal slices are often made by sawing suitable pieces from massive crystal pieces which are subsequently reduced to the desired dimensions by grinding and lapping. It is then importantly necessary to be able to measure the dimensions of the crystal slices to a high degree of accuracy at intervals during the grinding or lapping as well as when these operations are finished, to determine not only the thickness or the width at any given point but also departures from parallelism of the two broad faces of the slice. There are highly satisfactory devices available in the commercial market for effecting such measurements in which a stationary anvil has opposed thereto a contact member, both adjustably and resiliently movable toward and from the anvil in a direction perpendicular to a surface thereon, together with means actuated by the movable member to indicate accurately on a suitably calibrated scale the distance between the anvil and the movable member. One such device of a high degree of accuracy and reliability is disclosed and described in detail in U. S. Patent 2,244,964, granted June 10, 1941, to L. F. Poock et al. Such devices often include means, as disclosed in the patent cited, whereby the relation of the movable member to the indicating mechanism may be adjusted to correct for wear of the movable member in use, or other conditions which may require an alteration of the indication on the scale for a given position of the member relative to the anvil. In operation, the device may be checked for correctness of its calibration or adjusted to a desired dimension by placing on the anvil a standard block or ball or the like of accurate, known height and adjusting the member to give the required reading when in contact with the standard. In most instances the device is used as a gauge to detect and measure deviations from a standard dimension rather than to indicate the dimension in question directly. The device is adjusted to read zero on its scale at the standard dimension and to indicate over and under size in the pieces measured. In dealing with piezoelectric crystals, there may be a considerable number of standard dimensions in a sequence whose members are separated by very small steps. For instance, applicant's assignee makes square slices of crystalline quartz of hundreds of predetermined distinct thicknesses within a total range of difference from thickest to thinnest of less than one-tenth inch, and within a total range of difference of edge length (i. e. width across the square flat face of the slice) of about one-fifth inch, there are also hundreds of different predetermined dimensions. Evidently, to readjust to a gauge such as described each time a different one of these dimensions is to be gauged, when one instrument must serve several batches of work being carried on together, becomes an importantly time and labor consuming affair.

An object of the present invention is to provide a gauge such as described having as an additional feature means whereby the anvil may be adjusted in a simple, reliable and accurate manner to give the distance between the anvil and the movable contact member desired predetermined values within a relatively large range in comparison to the minimum variation of the distance practically registerable by the scale and pointer.

With the above and other objects in view, the invention may be embodied in a precision gauging apparatus having a contact member resiliently displaceable in linear motion and means to adjust the normal position of the member over a narrow range along the line of motion thereof, anvil means comprising a fixedly positioned base member having a relatively long screw threaded bore therein coaxial with the line of motion of the contact member, a shaft in the bore and having a relatively long threaded portion complementary to and engaged in and throughout substantially the whole of the threaded bore, and a contact face carried by the shaft and opposed to the contact member to effect gauging of an article inserted between the contact member and the contact face.

Other objects and features of the invention will appear from the following detailed description of one embodiment thereof taken in connection with the accompanying drawings, in which the same reference numerals are applied to identical parts in the several figures and in which Fig. 1 is a view in right side elevation, with parts broken away, of a gauge constructed in accordance with the invention;

Fig. 2 is a partial, enlarged, front elevation as indicated by the line 2—2 of Fig. 1;

Fig. 3 is a similarly enlarged plan view, with parts broken away, of the anvil; and Fig. 4 is a corresponding section on the line 4—4 of Fig. 3.

The invention as herein illustrated and described is embodied in an improved form of an apparatus generally shown in Fig. 1 and comprising a horizontal base 10 upon which is mounted a vertical pillar 11 having a rack 12 thereon. A housing or carriage 14 is arranged to be vertically slidable on the pillar and to be coarsely adjustably raised or lowered thereon by a pinion (not shown) within the housing engaging the rack 12 and actuable by a knurled wheel 15. A vertically and resiliently movable contact plunger 16 protrudes vertically downwardly from the housing and is vertically finely adjustable in the housing by means of a nut 17 as well as being adjustable with the housing as a carriage by means of the wheel 15. The housing is formed with a forwardly oriented hood 18 having an opening 19 through which is visible from without an arcuate scale 20 fixedly positioned within the housing. There is mechanism within the housing (not shown or described here) by which motion of the plunger 16 with respect to the housing 14 is translated into motion along the scale 20 of a ray of light impinging on the scale, the mechanism being sufficiently sensitive and accurate to convert vertical motion of the plunger of the order of fifty millionths of an inch into a corresponding visible displacement of the spot of light of one division on the scale 20. Directly under the plunger 16, the base 10 is formed with a horizontal slot 21, of rectangular cross-section and opening from the top and front surfaces of the base, to receive an anvil as hereinafter described. Also locking screws 22 are mounted in the side walls of the slot 21 as shown. Furthermore, the floor of the slot 21 may have a relief groove 23 as shown. As thus far described, the apparatus is a commercial article and, as procurable in the market, is provided with an anvil to fit in the slot 21 which is simply a suitably shaped solid block of metal. The mechanism contained in the housing 14 and in the base 10 by which electric current is supplied through cables 9 and 13 from the base to the housing from any suitable source (not shown) and by which the motion of the plunger 16 relative to the housing 14 is converted into motion of the light spot over the scale 20, is not herein shown or described, being no part of the present invention and being fully disclosed and described in U. S. Patent 2,244,964, above further identified, to which reference may be had if desired.

According to the present invention, there is positioned in the slot 21 and removably locked therein by the screws 22 an anvil block 24 whose horizontal upper surface rises triflingly above the upper surface of the base 10 to provide clearance above the base for members mounted on the block. Into the center of the block 24 is inset a vertical bushing 25 to rotatably journal a vertical shaft 26 in coaxial alignment with the plunger 16. The lower portion 27 of the shaft 26 is formed as a journal member to fit with freedom to rotate but without shake in the bushing 25. The middle portion of the shaft is slightly enlarged and formed with a micrometer thread 28, and the upper portion 29 of the shaft is of less diameter than the threaded portion and is smoothly cylindrical. A large, flat, circular disk 30 is rigidly and horizontally secured on the upper face of the block 24 by screws 31 and is formed in its upper surface with a coaxial cylindrical recess 32 having a perforation 33 to allow the shaft 26 to pass through. A cylindrical nut 34 split at 35 is threaded to match the thread 28 of the shaft 26, is positioned thereon, and is clamped in place on the shaft by a screw 36. The nut 34 resting on the floor of the recess 32 supports the shaft 26, and is held down in the recess 32 by a laminar annulus 37 secured coaxially on the disk 30 by screws 38. The upper surface of the disk 30 is formed with a wide, shallow counterbore 39 so that the annulus 37 is supported only around its edge and the screws 38 can be tightened down to clamp the nut 34 immovably down on the floor of the recess 32. The shaft 26 is then rotatable in the nut 34 against a frictional resistance whose severity is adjustable by means of the screw 36.

A circular disk 40 is rigidly secured, horizontally, on the upper portion 29 of the shaft 26, e. g. by being drive fitted thereon, to be rotatable therewith. The periphery of this disk is provided with a plurality of angularly equally spaced, vertical, radial slots 41 cut equally deeply into the disk. On the upper surface of the disk just inside the inner ends of the slots 41, is a circular scale 42. A turret-like anvil member proper 43 is secured in the center of the top face of the disk 40 by screws 44 and is formed with a central frusto-conical boss 45 having a central vertical bore 46, coaxial with the shaft 26 and the plunger 16, in which an insert 47 of hard material, e. g. tungsten carbide, is held by a screw 48. The common upper surface of the boss 45 and insert 47 is ordinarily accurately plane and at right angles to the common axis of the plunger 16 and shaft 26, although the insert 47 may, if desired, protrude above the boss 45 and may be curved on its upper end, if desired.

At the front side of the disk 40 and the front end of the block 24, is mounted a vertical post 50 secured to the disk 30 by screws 49. In the upper end of the post 50 is a horizontal bushing 51 having a bayonet joint slot 52 in its side wall and held in the post by a screw 53. A detent 54 is slidable and rotatable in the bushing 51 and carries a pin 55 engaging in the slot 52 and an axial detent finger 56 to be engaged in or withdrawn from any one of the slots 41 when aligned therewith to hold the disk 40 against rotation when engaged in a slot 41. Preferably, a housing 57 is suitably formed and secured in place to prevent admission of dust, and this is provided with a glass closed window 58.

In one particular instance in practise, the screw 28 has a thread of forty turns to the inch, the scale 42 on the disk 40 has two hundred and fifty divisions in its complete circumference, and the fifty slots 41 and placed five units of the scale apart. Thus an advancing turn of the disk 40 from one slot 41 to the next represents and effects a rise of the upper end of the insert 47 of 0.0005 or one half thousandth of an inch. Furthermore, the nut 34 engages all but four turns of the forty turns of thread on the inch long screw 28; and it is found that the irregularities, if any, in the vertical motion of the shaft 26 while advancing through these four turns are insignificantly small. Thus the shaft 26 can be moved up or down by steps of exactly one half thousandth inch by turning the dial disk 40 and engaging the finger 56 in successive slots 41 of the disk, over a total range of two hundred such steps, or one tenth inch. The scale 20 of the original apparatus has a range each way from its central, zero graduation mark of one thousandth inch of motion of the plunger 16 and is graduated in twenty steps each way from zero so that each graduation represents a motion of the plunger 16 of one half ten thousandth of an inch.

In operation, assuming that the cable 9 is connected to a suitable source of electric current and that the housing 14 is much too high on the pillar 11, let it be assumed that a batch of crystal slices is to be gauged whose thickness is desired to be twenty-three thousandths inch with a tolerance of plus or minus four ten thousandths. Let it be further assumed that there is conveniently available a standard precision type gauge block whose thickness is seven hundredths inch. The finger 56 is retracted to leave the dial disk 40 free to rotate. The disk 40 is rotated by manipulation of the knurled turret 43 until the screw 28 stands midway of the nut 34 and the zero of the scale 42 registers with the finger 56 which is then pushed forward into the corresponding slot 41 and locks the dial in this position. The seven hundredths inch block is placed on the top surface of the boss 45; and the housing 14 is brought down by manipulation of the wheel 15 until the tip of the plunger 16 just touches the block, and the indication of the light ray on the scale 20 is somewhere between the ends of the scale. This indication is then brought to the zero of the scale 20 by manipulation of the nut 17. The gauge block is then drawn out from between the plunger 16 and the boss 45, leaving the distance between these members precisely seven hundredths or seventy thousandths of an inch. This is greater than the desired twenty-three thousandths by forty-seven thousandths. The finger 56 is retracted and the dial disk 40 rotated counterclockwise as seen from above until ninety-four teeth have passed the finger 56 which is entered into the slot 41 behind the ninety-fourth tooth. This rotation is represented as illustrated by four hundred and seventy graduations of the scale 42, or one full turn of the dial plus two hundred and twenty graduations. This rotation of the dial raises the shaft 26 and therewith the dial disk 40 and turret 43 by precisely ninety-four times one-half thousandth inch or forty-seven thousandths; and now the distance between the top of the boss 45 and insert 47 below and the tip of the plunger 16 above is now precisely the desired twenty-three thousandths inch; and the device is ready for use in gauging the batch of slices by inserting these one at a time between the plunger and the boss. Since each division of the scale 20 represents half a ten thousandth inch displacement of the plunger 16, the gauging is amply accurate for the four ten thousandths tolerance.

If the apparatus of the prior art with a simple, solid anvil be used, there must be available an extensive set of precision gauge blocks if the instrument is to be used for gauging a considerable number of dimensions. It will be a rare instance when a single such block will chance to be available of the exact dimension desired. In most cases two or more such blocks will have to be "wrung" together. And in a shop where the articles to be gauged are being made from hard material by grinding or lapping, the wringing together of precision blocks requires extreme care lest these be injured by traces of abrasive dust.

With the adjustable anvil of the invention, a single precision block will suffice for all settings of the apparatus exceeding or falling short of the dimension of the block by an amount within the range of adjustment of the anvil, and wringing of blocks together is wholly unnecessary.

What is claimed is:

1. In a precision gauging apparatus having a contact member resiliently displaceable in linear motion and means to adjust the normal position of the member over a narrow range along the line of motion thereof, anvil means comprising a fixed base, a split clamp nut rigidly secured on the base and coaxial with the line of motion of the contact member, the pitch of the thread of the nut being less than the range of adjustment of the contact member, a correspondingly threaded shaft engaged in the nut, a clamping screw mounted in the nut to adjust the severity of the frictional resistance thereof to rotation of the shaft therein, a dial rigidly secured on the shaft and formed with angularly equally spaced detent means thereon, a movable detent mounted on the base to be engaged with the detent means on the dial or disengaged therefrom at will, and a contact face carried by the shaft and opposed to the contact member to effect gauging of an article inserted between the contact member and the contact face.

2. In a precision gauging apparatus having a contact member resiliently displaceable in linear motion and means to adjust the normal position of the member over a narrow range along the line of motion thereof, anvil means comprising a fixed base, having a slot therein transverse to the line of motion of the contact member, a removable base positioned in the slot, a split clamp nut rigidly secured on the removable base and coaxial with the line of motion of the contact member, the pitch of the thread of the nut being less than the range of adjustment of the contact member, a correspondingly threaded shaft engaged in the nut, a clamping screw mounted in the nut to adjust the severity of the frictional resistance thereof to rotation of the shaft therein, a dial rigidly secured on the shaft and formed with angularly equally spaced detent means thereon, a movable detent mounted on the removable base to be engaged with the detent means on the dial or disengaged therefrom at will, and a contact face carried by the shaft and opposed to the contact member to effect gauging of an article inserted between the contact member and the contact face.

ROGER W. YOUNG.